April 18, 1933.  A. M. DINKLER ET AL  1,904,360
BRAZING SOLDER
Filed Aug. 9, 1932
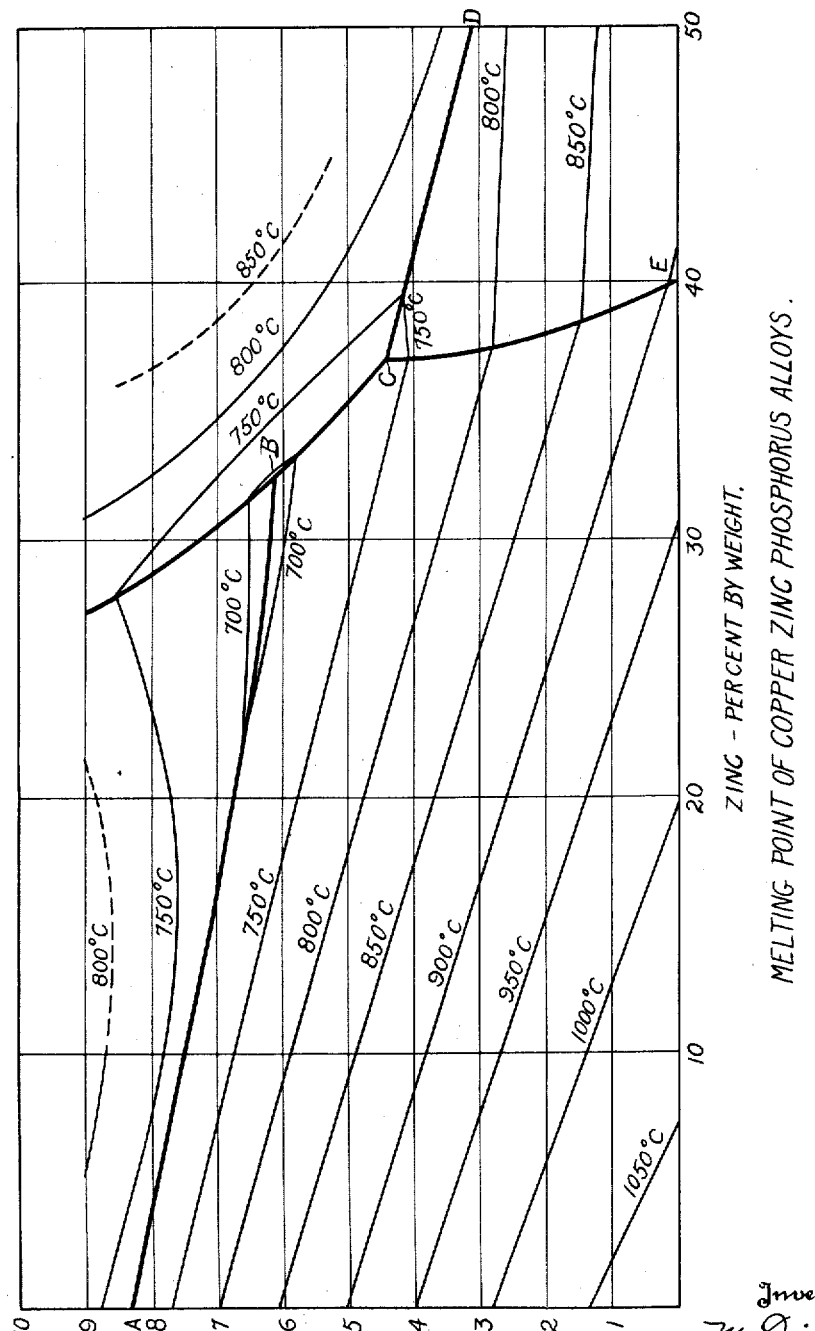
Inventors
August M. Dinkler
and Cyril Stanley Smith
By Wooster & Davis
Attorneys Patented Apr. 18, 1933

1,904,360

UNITED STATES PATENT OFFICE

AUGUST M. DINKLER, OF WATERBURY, AND CYRIL STANLEY SMITH, OF CHESHIRE, CONNECTICUT, ASSIGNORS TO THE AMERICAN BRASS COMPANY, OF WATERBURY, CONNECTICUT, A CORPORATION OF CONNECTICUT

BRAZING SOLDER

Application filed August 9, 1932. Serial No. 628,006.

This invention relates to alloys and more particularly to alloys for brazing, soldering and welding purposes, and has for an object the production of a low melting point alloy for use as brazing solder. Brazing solder customarily employed consists of an alloy of approximately equal proportions of copper and zinc, and melts at about 880° C. A series of alloys which finds some application where a low melting point solder is required is the copper-phosphorus series, in which the alloy of lowest melting point contains about 8.4 percent phosphorus and melts at 714° C. We have found that by replacing part of the copper by an equivalent amount of zinc up to about 32.5 percent, alloys of essentially the same characteristics as the binary copper-phosphorus alloys are obtained, except that the melting point is decreased and the fluidity somewhat improved while the cost of the alloy is reduced. Beyond about 32.5 percent zinc the melting point progressively increases, on account of the appearance of the so-called beta phase of the copper-zinc system. Additions of phosphorus are less effective in reducing the melting point of alloys containing the beta phase than they are in alloys in which alpha is the primary constituent for a phosphide containing zinc and having a high melting point occurs in this portion of the diagram. The alloy of lowest melting point in the series containing less than 55 percent zinc occurs at about the composition 25–32.5 percent zinc, 6.5–6.0 percent phosphorus, and 61.5–68.5 percent copper. These alloys melt completely at about 695° C., a figure which should be compared with 714° C., the melting point of the binary copper-phosphorus eutectic at 8.4 percent phosphorus.

The melting point of the useful portion of the series according to our researches is shown in the figure of the drawing, the melting points being accurate to within about 10° C. The line AB represents the course of the binary eutectic between alpha and $Cu_3P$ across the solid model of the ternary diagram, the point B representing the ternary eutectic formed by the reaction of liquid, $Cu_3P$, alpha, and a zinc-rich phosphide of unknown composition. It is obvious from the diagram that substantially the same melting point is obtained by any alloys along AB, although the temperature of melting rises somewhat rapidly along BC which represents the binary eutectic between the alpha phase and the zinc-containing phosphide, and even more rapidly along CE or CD. On the basis of melting point alone, the alloy B is the most satisfactory solder but substantially the same results are obtainable with any alloy along AB and we have obtained particularly good results with the alloys containing approximately 27.5 percent zinc, 6.2 percent phosphorus.

The brittleness of alloys containing less than 55 percent zinc is a function of the phosphorus content, and alloys of lower phosphorus content than the eutectic are often advisable where a stronger and more ductile joint is required. We prefer, however, to limit the composition to a point where the melting point, as shown in the figure of the drawing is less than 850° C., the amount of phosphorus being greater than 2.5 percent. Although the alloys are malleable in certain ranges of composition and may be hot worked to the form of wire, rod, sheet or strip, other alloys are too brittle for this to be done, but any of the alloys may be used in the granulated condition.

No flux is needed if the surface of the metal being joined is perfectly clean, but the use of a flux which is partly or completely molten at the melting point of the solder is always advantageous. We have obtained satisfactory results using the alloys to solder brass, bronze and other copper alloys and they may be used as a general solder for joining any metals or alloys where the melting point falls in the range desirable. Their use is not particularly recommended on steel or iron alloys for the formation of a double zone of brittle iron phosphides between the steel surface and the body of the solder renders the joints very brittle.

On account of the high fluidity and low melting point the alloys are suitable for die castings or permanent mold castings where accuracy of finish is desired and high ductility is not of importance.

Having thus set forth the nature of our invention, what we claim is:

1. An allow composed of a substantial amount of phosphorus above 2.50 and up to 10 percent, from 5 to 50 percent zinc, the balance being principally copper.

2. An alloy composed of approximately 25–32.5 percent zinc, 6.5–6.0 percent phosphorus, 61.5–68.5 percent copper.

3. An alloy composed of approximately 27.5 percent zinc, and 6.2 percent phosphorus, the balance being principally copper.

4. An alloy composed of approximately 32.5 percent zinc, 6.1 percent phosphorus, the balance being principally copper.

In testimony whereof we affix our signatures.

AUGUST M. DINKLER.
CYRIL STANLEY SMITH.

CERTIFICATE OF CORRECTION.

Patent No. 1,904,360.   April 18, 1933.

AUGUST M. DINKLER, ET AL.

It is hereby certified that error appears in the printed specification of the above numbered patent requiring correction as follows: Page 2, line 5, claim 1, for "allow" read alloy; and that the said Letters Patent should be read with this correction therein that the same may conform to the record of the case in the Patent Office.

Signed and sealed this 16th day of October, A. D. 1934.

(Seal)

Leslie Frazer
Acting Commissioner of Patents.

accuracy of finish is desired and high ductility is not of importance.

Having thus set forth the nature of our invention, what we claim is:

1. An allow composed of a substantial amount of phosphorus above 2.50 and up to 10 percent, from 5 to 50 percent zinc, the balance being principally copper.

2. An alloy composed of approximately 25-32.5 percent zinc, 6.5-6.0 percent phosphorus, 61.5-68.5 percent copper.

3. An alloy composed of approximately 27.5 percent zinc, and 6.2 percent phosphorus, the balance being principally copper.

4. An alloy composed of approximately 32.5 percent zinc, 6.1 percent phosphorus, the balance being principally copper.

In testimony whereof we affix our signatures.

AUGUST M. DINKLER.
CYRIL STANLEY SMITH.

CERTIFICATE OF CORRECTION.

Patent No. 1,904,360.                                  April 18, 1933.

AUGUST M. DINKLER, ET AL.

It is hereby certified that error appears in the printed specification of the above numbered patent requiring correction as follows: Page 2, line 5, claim 1, for "allow" read alloy; and that the said Letters Patent should be read with this correction therein that the same may conform to the record of the case in the Patent Office.

Signed and sealed this 16th day of October, A. D. 1934.

(Seal)

Leslie Frazer
Acting Commissioner of Patents.

CERTIFICATE OF CORRECTION.

Patent No. 1,904,360.                                       April 18, 1933.

AUGUST M. DINKLER, ET AL.

It is hereby certified that error appears in the printed specification of the above numbered patent requiring correction as follows: Page 2, line 5, claim 1, for "allow" read alloy; and that the said Letters Patent should be read with this correction therein that the same may conform to the record of the case in the Patent Office.

Signed and sealed this 16th day of October, A. D. 1934.

Leslie Frazer (Seal)                                       Acting Commissioner of Patents.